United States Patent [19]

Thinnes

[11] Patent Number: 4,621,589
[45] Date of Patent: Nov. 11, 1986

[54] CHILD SECURITY DEVICE

[76] Inventor: Thomas A. Thinnes, 7726 N. Fourth Ave., Phoenix, Ariz. 85020

[21] Appl. No.: 714,884

[22] Filed: Mar. 22, 1985

[51] Int. Cl.⁴ ............................................. A01K 27/00
[52] U.S. Cl. ....................................... 119/96; 119/124
[58] Field of Search ................. 119/96, 106, 109, 124; 280/33.99 B

[56] References Cited

U.S. PATENT DOCUMENTS 3,088,438  5/1963  Oliphant ................................. 119/96
3,350,136 10/1967  Allen .......................... 280/33.99 B X
3,937,418  2/1976  Critelli ............................. 119/109 X
4,398,500  8/1983  Koronkiewicz ..................... 119/109

Primary Examiner—Hugh R. Chamblee
Attorney, Agent, or Firm—Gregory J. Nelson

[57] ABSTRACT

A child restraint for restricting the distance a child can wander from a parent or attendant for use in connection with a conventional shopping cart. The restraint has a cable reel at one end which selectively pays out a length of tether cable. The reel is attachable to the frame of a shopping cart by a lock which may be released by the attendant or store personnel. The opposite end of the tether cable is attached to a harness or cuff which may be attached about the child and locked in place by a key or combination lock. In the preferred embodiment, the harness is secured about the child by a combination lock which carries indicia which in the correct combination for opening the lock spell out a simple word which may be easily memorized by the user.

7 Claims, 13 Drawing Figures

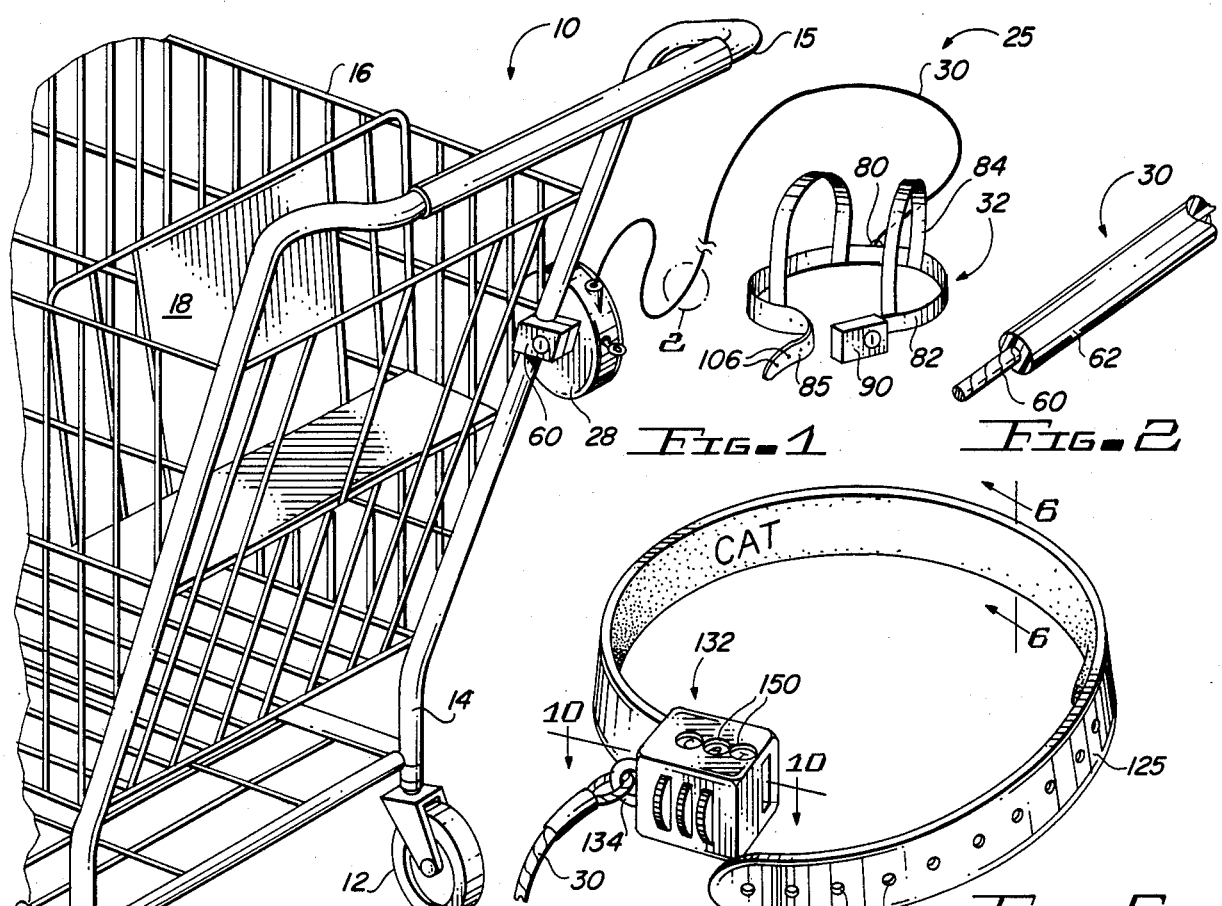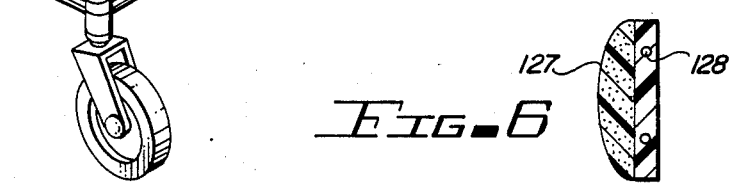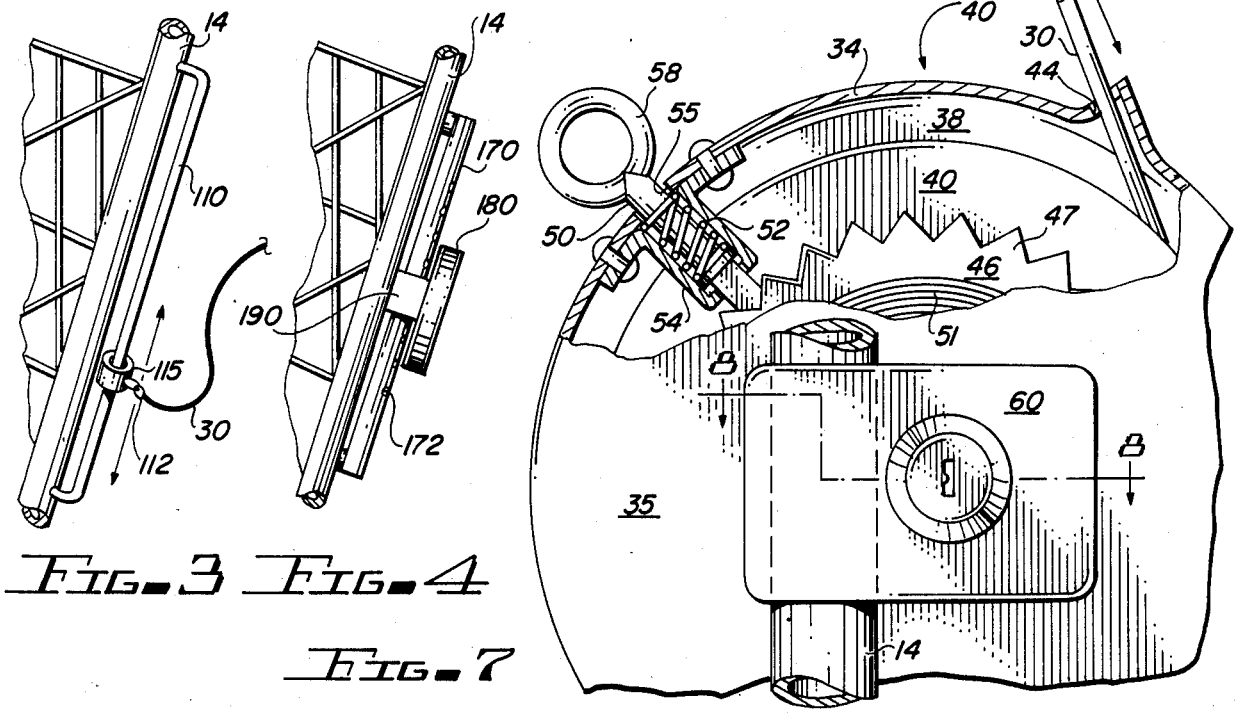

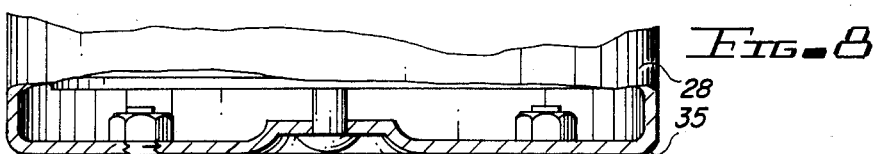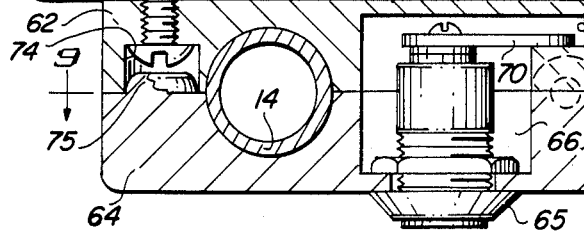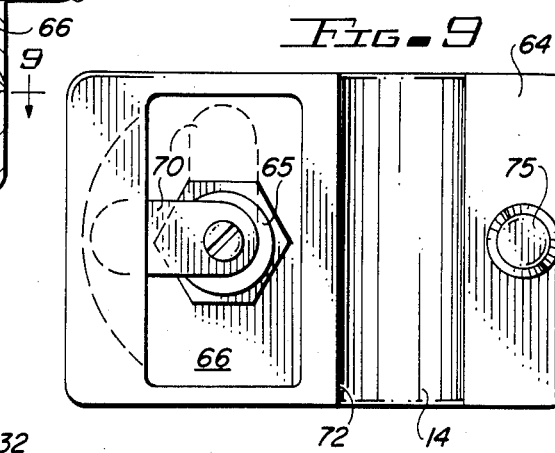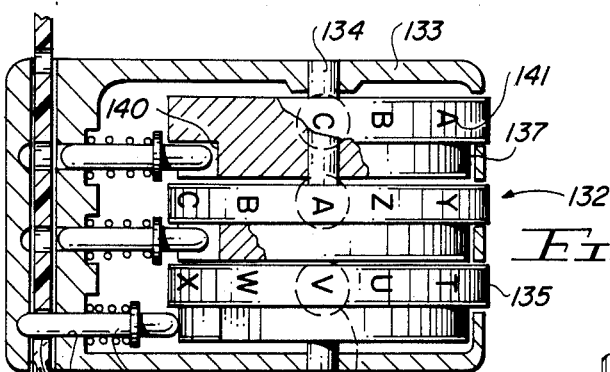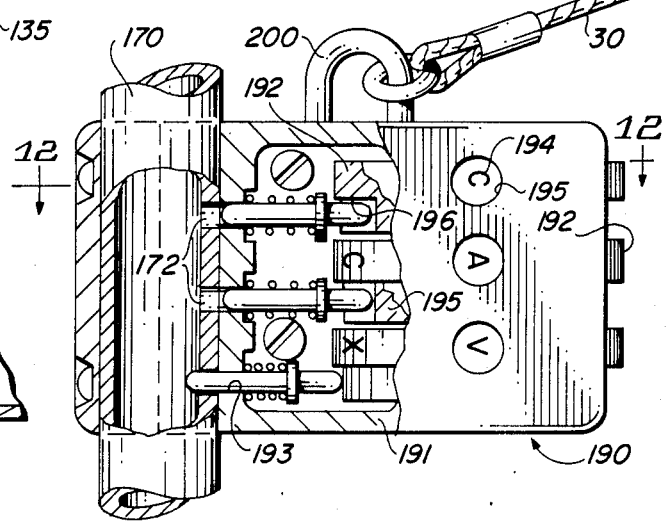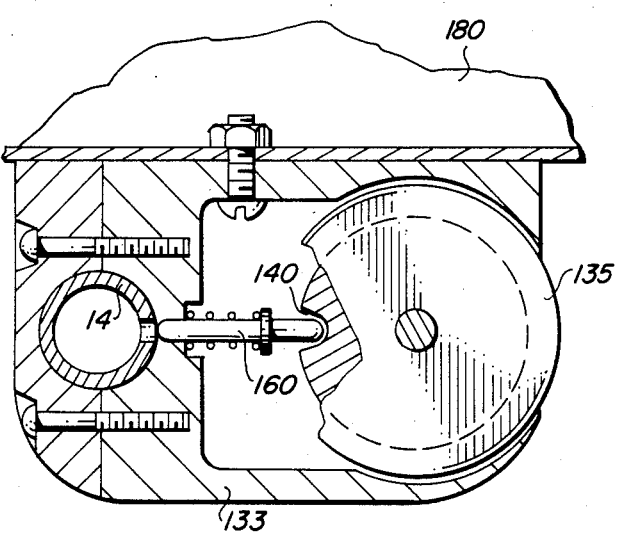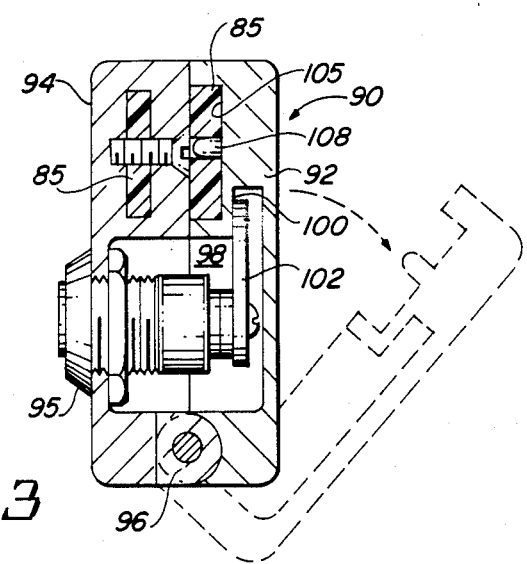

CHILD SECURITY DEVICE

The present invention relates to a child security device and more particularly relates to a tether attachable to a child to deter child abduction.

During recent years, the problem of child snatching or child abduction has attracted wide attention. Unfortunately, it is not uncommon for a small child to be taken while momentarily unattended by the parent or custodian for illicit purposes. Child snatching often occurs in public places such as shopping malls, stores and supermarkets. A parent or guardian need only leave a child unattended for a few moments or a child may wander off from the parent or guardian and become the victim of such a crime. Police authorities indicate that because of the nature of the crime, a device which would call attention to the perpetrator or which would serve to delay the abduction or make it more difficult would serve as a deterrent.

Various child safety restraints can be found in the prior art. Generally these safety restraints consist of a safety leader having a leash attachable at one end to the child and secured at the other end to the adult. For example, safety leaders of this type are shown in U.S. Pat. Nos. 2,994,300 and 3,104,650. Similar harnesses for children are shown in U.S. Pat. No. 1,711,864. U.S. Pat. No. 2,758,769 discloses an improvement in harnesses which is adapted for use as a safety restraint.

While the foregoing harnesses and restraints are suitable for their purpose, they are intended either as simple harness arrangements or as safety restraints in automobiles. These devices are not particularly intended as a child security device and further are not particularly adapted for use when a parent or guardian is shopping and finds it necessary to leave the child unattended for a moment to select or inspect merchandise. Accordingly, there exists a need in the art for a child security restraint which a parent or custodian can attach to the child and to a shopping cart or similar device to allow the parent freedom to freely shop and move about without having to continually monitor the activities of the child.

Briefly, the present invention comprehends a child security restraint for attachment to a device such as a shopping cart at one end and to the child at the other. The device is attachable at the shopping cart by a lock controlled by the store operator or the parent or custodian. The device includes a reel which pays-out a predetermined length of reinforced tether cable. The child is secured at the opposite end of the cable by a lockable harness or cuff. In the preferred embodiment of the invention, the child restraint is provided with a simple combination lock which may be opened to secure and release the child. The reel securable at the shopping cart is vertically adjustable along a frame member of the cart. A ratchet is incorporated with the reel to regulate the length of cable and accordingly the distance the child may travel from the cart.

The above and other objects and advantages of the present invention will become more apparent from the following description, claims and drawings in which:

FIG. 1 is a perspective view of a typical shopping cart with the security device of the present invention attached thereto;

FIG. 2 is a detail view of a section of the tether cable as indicated in FIG. 1;

FIGS. 3 and 4 are detail sectional views of modified forms of shopping carts to which one end of the security device may be attached;

FIG. 5 is a perspective view of a cuff with a combination lock which may be secured about an arm or other limb of a child;

FIG. 6 is a sectional view taken along lines 6—6 of FIG. 5;

FIG. 7 is a detail view partly broken away of the tether reel;

FIG. 8 is a sectional view taken along lines 8—8 of FIG. 7;

FIG. 9 is a sectional view taken along lines 9—9 of FIG. 8;

FIG. 10 is a sectional view taken along lines 10—10 of FIG. 5 showing the details of construction of the combination lock;

FIG. 11 is a detail view partly broken away of a combination lock for attaching the tether to the modified form of the cart shown in FIG. 4;

FIG. 12 is a sectional view taken along lines 12—12 of FIG. 11; and

FIG. 13 is a sectional view taken along lines 13—13 of FIG. 1.

Turning now to the drawings, FIG. 1 shows a preferred embodiment of the present invention in connection with a conventional shopping cart. The shopping cart 10 is supported for rolling movement on casters 12 and has a tubular steel frame including generally vertical members 14 at the rear of the cart which support horizontal handle bar 15. The wire basket 16 is supported on the frame for reception of articles. A seat 18 may also be incorporated in the basket 16 and unfolded to allow a small child to sit within the basket 16 facing the user of the cart.

When the parent, guardian or custodian is shopping, it is often difficult to keep track of small children. The child must generally be placed in the seat 18. For the ambulatory child this is often to confining and the child will want to walk along side the adult. Thus, the adult is faced with the problem of manipulating the cart and also attending to the child which usually requires holding the child by the hand. This makes it extremely difficult for the adult to shop which requires inspection of articles for sale on the shelves and removal and placement of the articles in the basket. While the adult is preoccupied with shopping activities, it is not unusual for the child to wander from the parent and become lost or possibly become the victim of child abduction.

Accordingly, the present invention provides a child security device generally designated by the numeral 25 which includes a reel 28 attachable to frame member 14 of the cart. A tether or cable 30 is retractably secured to the reel 28 and has a child restraint cuff or harness member 32 at the opposite end of the cable.

Reel 28 is shown in greater detail in FIGS. 7 and 8 and includes a case or housing having a cylindrical outer member 34 and opposite sides 35 which define an interior chamber 38. The case may be made of any suitable material such as a high impact plastic such as styrene, ABS or the like. A cable reel 40 is rotatably disposed within the housing and receives a predetermined length of cable 30 which extends through an appropriate opening or aperture 44 in the housing. One side of the reel is provided with a sprocket 46 having a plurality of teeth 47 which are selectively engageable with detent pin 50. Detent pin 50 is biased by spring 52 into engagement with sprocket teeth 47 and is reciprocal within barrel housing 54. Pin 50 extends through an aperture 55 in the housing having an outer end 58 in the form of a ring or other shape convenient for grasping by the user. Sprocket 47 and reel 40 are spring loaded by spring 51 so that upon release of detent pin 50, reel 40 will rotate to wind cable upon the reel. Any convenient length of the cable 30 may be payed out simply by retracting pin 50 and pulling cable 30 to the desired length against the spring tension applied by spring 51 at which position pin 50 is re-engaged with the sprocket. Thus, a predetermined length of the cable may be payed out which limits the distance the child can travel from the associated cart.

The cable reel is securable to the frame member 14 of the shopping cart by a locking device 60. Lock 60, as shown in FIGS. 7, 8 and 9, has body section 62 secured to the sidewall 35 of the reel. A cooperating body member 64 is engageable with body member 62 by lock 65. As best seen in FIGS. 8 and 9, body members 62 and 60 define internal cavity 66. Body portion 62 further defines a semi-circular recess 66 which defines a latch portion. Lock 65 is mounted on the body member 64 and upon actuation of lock 65 to an unlocked position, latch 70 will assume a vertical position allowing the body member 60 and 62 to be separated. When lock 65 is turned approximately 90° to the left, as viewed in FIG. 9, the latch 70 will come into full engagement with a surface of recess 66 locking the body sections 62 and 64 together.

Body sections 60 and 62 further define a vertically extending circular bore 72 which corresponds to the diameter of the frame member 14. A blind bore 74 is provided in the face of body member 62 and is adapted to align with projection 75 at the rear surface of body member 60. This provides a positive means of aligning body members 60 and 62 when locking the reel in place at the frame member 14. This also permits the reel to be adjusted vertically along member 14. For an older child, the reel assembly will be positioned at a higher elevation than for a smaller child. In this embodiment, the security device 25 is personal and could be carried by the child's custodian to the store and secured to the shopping cart by the attendant by use of a key operated lock 65. The key to the lock is maintained by the custodian.

Alternatively, the security device could be loaned as a convenience by the store and attached by a store employee at the request of the child's attendant. Because the reel is locked in place, it cannot easily be detached by either the child or by an unauthorized person. A key would be maintained by the child's custodian as well as by store personnel.

Tether cable 30, as best seen in FIG. 2, preferably has a hardened steel core 60 resistant to severance by bolt cutters and the like and is coated with an outer casing 62 of plastic or other material for safety. The free outer end of the cable 30 is secured to harness 32 at eyelet 80.

As best seen in FIGS. 1 and 13, the safety restraint includes a belt portion 82 for encircling the waist of the child which is further provided with straps 84 which extend from the belt over the shoulders of the child. The free end 85 of the belt is engageable in a lock 90 when the restraint is placed about the child. The lock may be key operated and is shown in greater detail in FIG. 13. Lock 90 includes two engaging body members 92 and 94 pivotally joined at hinge 96. In the open position, members 92 and 94 may be swung apart as shown by the dotted lines. A key operated lock 95 is secured to body member 94 and extends into the internal opening 98 defined by members 90 and 94. Body member 92 defines a locking surface 100 which is engaged by latch member 102 in the closed position. Latch 102 is similar to that described with reference to FIGS. 8 and 9 and may be key operated to a position clear of locking surface 100 to allow the body members to be opened. One end of belt member 82 is secured to body member 94. The free end 85 of belt 82 may be appropriately inserted in recess 105 and one of the holes 106 selectively engaged with pin 108 to snug the belt about the child. In this position, the body members are closed and lock 95 engaged to prevent unauthorized removal of the restraint harness 32 from the child. The key would be carried by the child's attendant and the child could be released at the appropriate time.

An alternate version of the security restraint or tether is illustrated in FIG. 3. In this figure, the tether 30 is permanently secured to a swivel connection 112 at generally circular collar 115 which is vertically slidable about rod 110 secured to frame member 14. The vertical movement of the collar 112 along rod 110 allows the restraint to be used with children of various sizes. The opposite end of cable 30 is attached to a child restraint or cuff as shown in FIG. 1 and alternatively of the type as shown in FIGS. 5 and 6.

In FIGS. 5 and 6 the child restraint is in the form of a cuff 125 consisting of a band of leather, plastic or other flexible material. The band is preferably padded with a suitable resilient material 127 on the inner side and may be further reinforced with hardened steel strands 128 extending longitudinally through the cuff 125. The free end of the cuff is provided with a plurality of spaced apart holes 130 to adjust the cuff to the child. Typically, the cuff would be placed about the wrist of the child when in use. The opposite end of the cuff 125 is provided with a combination lock 132 which is secured to the end of cable 30 at eyelet 134. The combination lock 132 is shown in greater detail in FIG. 10. The use of a combination lock eliminates the necessity for the attendant to carry a key and permits more universal use of the device. The combination lock 132 includes a housing 133 having axially extending shaft 134 which rotatably carries a plurality of thumb wheels 135. Each of the thumb wheels 135 has an integral disk 137 defining a recess 140 at a selected position on its periphery. The surface of the thumb wheel carries selective indicia 141. Indicia 141 are shown as letters rather than numbers whch permits the combination to be selected as a simple three-letter work which is preferable as it is easier for the user to remember a word combination. One surface of the housing is provided with a series of apertures 150 which align with the indicia 141 on the thumb wheel.

A reciprocal tumbler or plunger pin 160 is associated with each of the locking disks 137. The plungers 160 are slidable in bores 162 in the housing. Bores 162 are intercepted by longitudinally extending slot 165 which is adapted to receive the end of cuff 125. The inner end of plungers 160 engage the surface of disk 137 and in the locked position are maintained in a position with the plunger extending through slot 165 and engaging apertures or holes 131 in the cuff when the cuff 125 is in position in the slot. With the thumb wheels 137 rotated to the correct unlocking combination, indicia 141 will be aligned with the openings 150 in the lock at which position recesses 140 will also be aligned with the respective tumbler pins 160 to allow the tumbler pins 160 to withdraw freeing the cuff.

FIGS. 11 and 12 illustrate another embodiment of the invention in which the reel case may be selectively attached to a modified form of the grocery cart by means of a combination lock. As best seen in FIG. 4, the shopping cart is modified by the addition of a generally vertically extending tube 170 which preferably would be welded, clamped or otherwise secured to frame member 14 and extends parallel thereto. Frame member 170 is provided with a number of spaced apart holes 172 extending longitudinally along the member 170. The reel 180 is constructed as described with reference to FIGS. 7 and 8 and further detailed description is not deemed necessary. The combination lock 190 is constructed in a manner similar to the lock shown in FIGS. 9 and 10 and consists of a housing 191 containing a plurality of rotatable thumb wheels 192. A tumbler 193 is associated with the locking disk 195 at the side of each of the thumb wheels. The tumblers are reciprocally mounted and in the unlocked position, appropriate indicia 194 will register with the viewing aperture 195 at which location a recess 196 will align with the inner end of the tumbler 193 allowing it to move inwardly to an unlocked position. Again, the indicia are shown as letters which for the convenience of the user may be a simple three-letter work such as "CAT". The reel and combination lock assembly are secured to cable 30 at a suitable connection 200. The cable 30 is preferably constructed as described with reference to FIG. 2 and is of a suitable hardened steel covered with an appropriate resilient coating. The opposite free end of the cable is attached to a harness as shown in FIG. 1 or 5.

The reel and lock assembly are secured to the shopping cart by positioning the combination lock in alignment with tube member 170 and engaging longitudinally extending aperture 172 in the tube. The lock may be slipped about the tube and engaged at the appropriate elevation by moving the thumb wheels to cause the tumblers 193 to register with the spaced apart holes 172 in the tube. Thus, neither the lock nor the harness can be easily removed from the child and any unauthorized attempt may serve to deter a child abduction as it will either delay the abduction or draw attention to the individual making the attempt.

It will be apparent from the foregoing, that the present invention provides a deterrent to child abduction and also provides a convenient means for a parent or other child attendant to restrict the movement of the child to facilitate shopping activities. The device may be provided as a permanent part of a cart by the store with the harness openable by a key or combination lock which key or combination is provided to the user by the store personnel. As an alternative, the device can be personalized and carried by the parent or attendant and attached by means of a lock to the cart with the other end secured to the child. The use of a locking reel allows the length of the cable to be adjusted in accordance with the attendants requirements.

The present invention can be easily manufactured and can be constructed from a variety of materials at economical costs.

It will be obvious to those skilled in the art to make various alterations, modifications and changes to the child safety restraint of the present invention. To the extent such alterations, modifications and changes do not depart from the spirit and scope of the appended claims, they are intended to be encompassed therein.

I claim:

1. A security restraint for use with a conventional shopping cart having a frame mounted on wheels with the frame including a generally vertical frame member, said restraint comprising:
   (a) a tether having opposite first and second ends;
   (b) reel means receiving the first end of said tether for paying out and rewinding said tether, said reel means having mounting means for detachable securement to said frame member at a predetermined height, said reel means including locking means for securing said reel means at a predetermined position for paying out a predetermined length of tether;
   (c) harness means secured to the said second end of said tether with releasable locking means for securing said harness about said child whereby the reel means may be secured to the shopping cart frame member at a height commensurate with the height of the child and whereby said tether may be payed out a predetermined distance with the restraint means locked about the child thereby restraining the child from wandering beyond a predetermined distance from the cart.

2. The restraint of claim 1 wherein said locking means is operable by a key.

3. The restraint of claim 1 wherein said restraint means is padded and said tether means comprises a metal cable provided with a resilient outer coating.

4. The restraint of claim 1 wherein said locking means comprises a combination lock.

5. The restraint of claim 4 wherein said harness is imprinted with the combination at a location not generally visible when the harness is in position about a child.

6. The restraint of claim 4 wherein said combination locking means is operable to an open position by means of a combination including indicia spelling out a simple word.

7. The restraint of claim 6 wherein said vertical frame member defines a plurality of spaced apertures and wherein said combination locking means includes bolt means selectively engageable in said aperture means in a locked position to secure said reel to said frame member.

* * * * *